(12) United States Patent
Grattan

(10) Patent No.: US 10,526,017 B2
(45) Date of Patent: Jan. 7, 2020

(54) VEHICLE BODY STRUCTURE

(71) Applicant: Nissan North America, Inc., Franklin, TN (US)

(72) Inventor: Patrick Ramses Grattan, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 94 days.

(21) Appl. No.: 15/966,898

(22) Filed: Apr. 30, 2018

(65) Prior Publication Data
US 2019/0329824 A1 Oct. 31, 2019

(51) Int. Cl.
B62D 21/15 (2006.01)
B62D 21/02 (2006.01)
B62D 21/05 (2006.01)
B62D 25/08 (2006.01)

(52) U.S. Cl.
CPC ........... *B62D 21/152* (2013.01); *B62D 21/02* (2013.01); *B62D 21/05* (2013.01); *B62D 25/082* (2013.01)

(58) Field of Classification Search
CPC ........ B62D 21/02; B62D 21/03; B62D 21/05; B62D 21/15; B62D 21/152; B62D 21/155; B62D 25/082
USPC ......................................... 296/187.09, 187.1
See application file for complete search history.

(56) References Cited

U.S. PATENT DOCUMENTS

| 4,225,167 | A  | 9/1980  | Buettner et al.   |
| 6,604,884 | B1 | 8/2003  | Ohkura            |
| 6,813,818 | B2 | 11/2004 | Schmidt           |
| 7,137,658 | B2 | 11/2006 | Haneda et al.     |
| 7,819,218 | B2 | 10/2010 | Eichberger et al. |
| 7,900,983 | B2 | 3/2011  | Saitou            |
| 8,398,153 | B1 | 3/2013  | Dandekar et al.   |
| 8,590,950 | B2 | 11/2013 | Hermanson et al.  |
| 8,764,096 | B2 | 7/2014  | Han et al.        |
| 8,985,258 | B1 | 3/2015  | Midoun et al.     |
| 8,985,671 | B1 | 3/2015  | Lei et al.        |
| 9,056,634 | B2 | 6/2015  | Watanabe          |
| 9,067,549 | B2 | 6/2015  | Baccouche et al.  |

(Continued)

FOREIGN PATENT DOCUMENTS

| DE | 102013003911 A1 | 9/2014 |
| EP | 2487055 A1      | 8/2012 |
| WO | 03-051654 A1    | 6/2003 |

*Primary Examiner* — Jason S Daniels
(74) *Attorney, Agent, or Firm* — Global IP Counselors, LLP

(57) ABSTRACT

A structural member extends in a vehicle longitudinal direction. An off-center impact structure has a first member and a second member. The first member has a linear portion and an offset portion both having a hollow interior. The first linear portion extends through a first opening in the structural member in a direction perpendicular to the structural member and further extends in an outboard direction from the structural member. The offset portion is angularly offset from the first linear portion and extends laterally outboard and forward relative to the structural member. The second member has a first section and a second section. The first section is disposed within the hollow interior of the linear portion of the first member and the second section extends through of an opening in the first member outboard from the opening of the first member away from the hollow interior.

19 Claims, 13 Drawing Sheets

(56) References Cited

U.S. PATENT DOCUMENTS

| | | | |
|---|---|---|---|
| 9,079,619 B2 | 7/2015 | Gupta et al. | |
| 9,180,915 B2 | 11/2015 | Kim | |
| 9,193,318 B2 | 11/2015 | Barbat et al. | |
| 9,233,716 B2 | 1/2016 | Midoun et al. | |
| 9,266,485 B2 | 2/2016 | Kuriyama et al. | |
| 9,272,678 B2 | 3/2016 | Nam et al. | |
| 9,272,679 B1 | 3/2016 | Ramoutar et al. | |
| 9,415,805 B2 | 8/2016 | Fujikawa et al. | |
| 9,421,927 B2 | 8/2016 | Basappa et al. | |
| 9,908,564 B1 | 3/2018 | Grattan | |
| 10,118,644 B2 * | 11/2018 | Grattan | B62D 21/07 |
| 10,150,507 B2 * | 12/2018 | Grattan | B62D 21/02 |
| 10,189,503 B2 * | 1/2019 | Grattan | B62D 21/152 |
| 2008/0023954 A1 | 1/2008 | Eichberger et al. | |
| 2009/0302591 A1 | 12/2009 | Auer et al. | |
| 2015/0021935 A1 | 1/2015 | Baccouche et al. | |
| 2015/0048650 A1 * | 2/2015 | Gupta | B62D 21/152 296/187.1 |
| 2015/0298742 A1 | 10/2015 | Ono et al. | |
| 2015/0336525 A1 | 11/2015 | Nam et al. | |
| 2015/0360633 A1 | 12/2015 | Nishida et al. | |
| 2018/0065669 A1 | 3/2018 | Ghislieri et al. | |

* cited by examiner

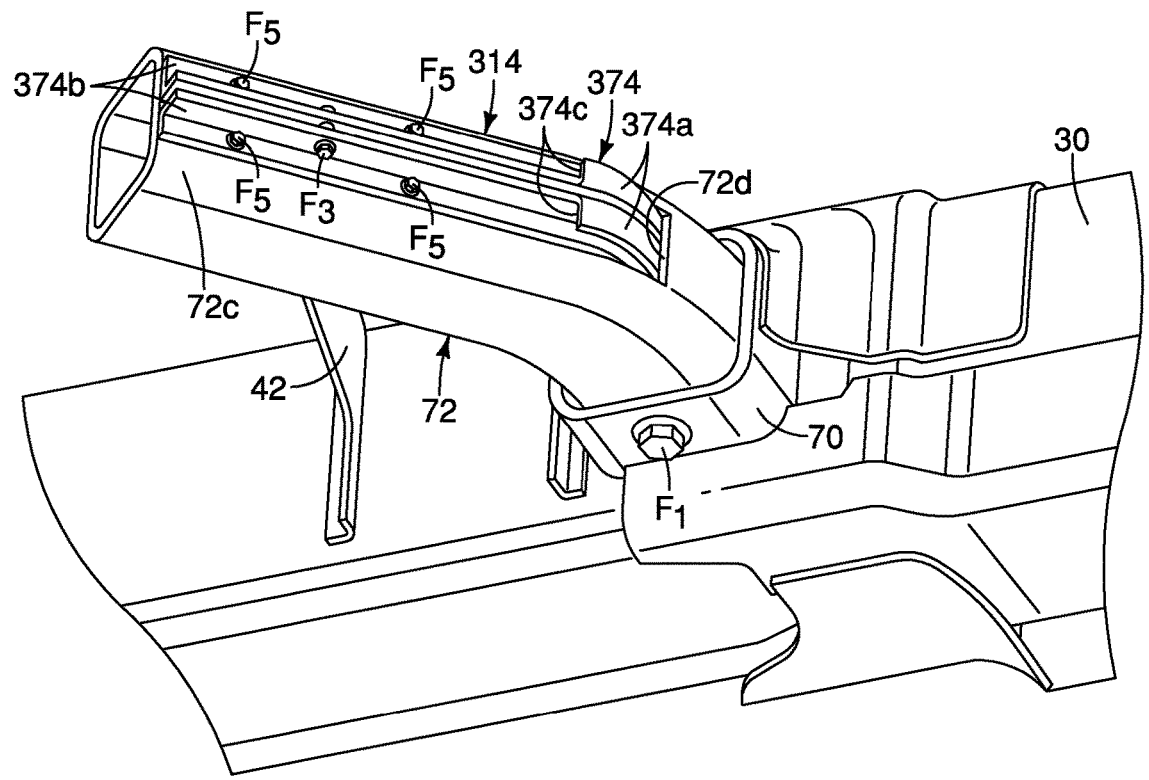
FIG. 20
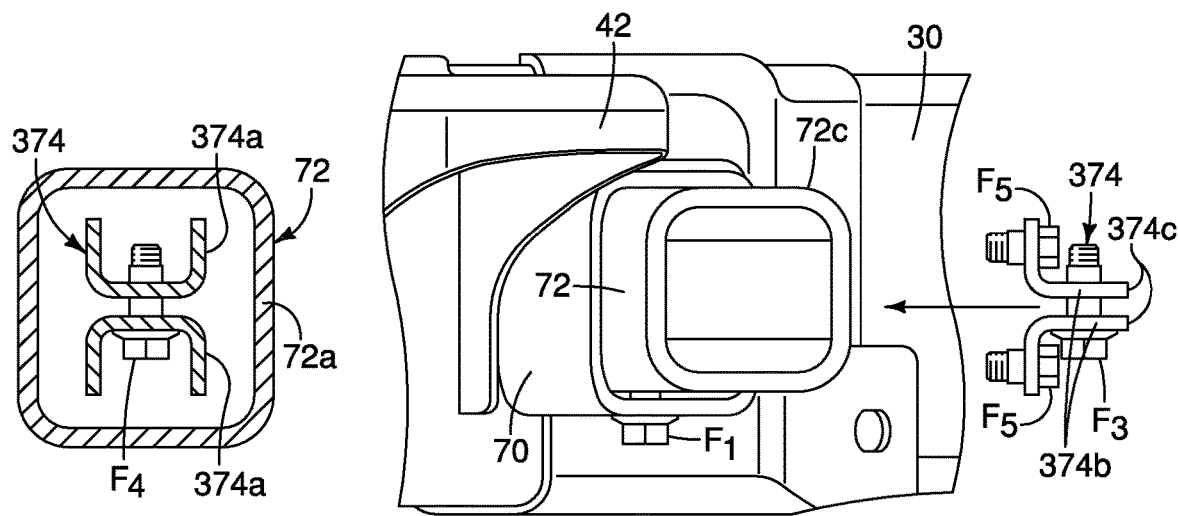
FIG. 21
FIG. 22

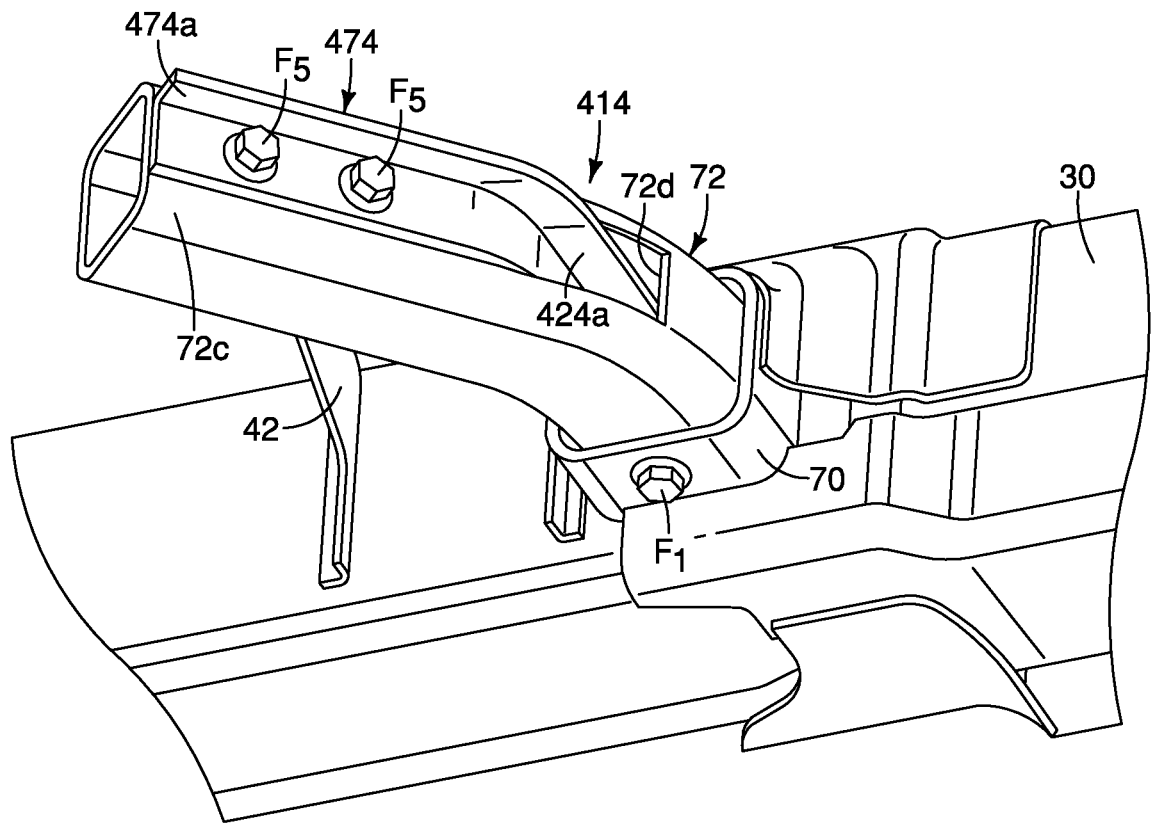
FIG. 23
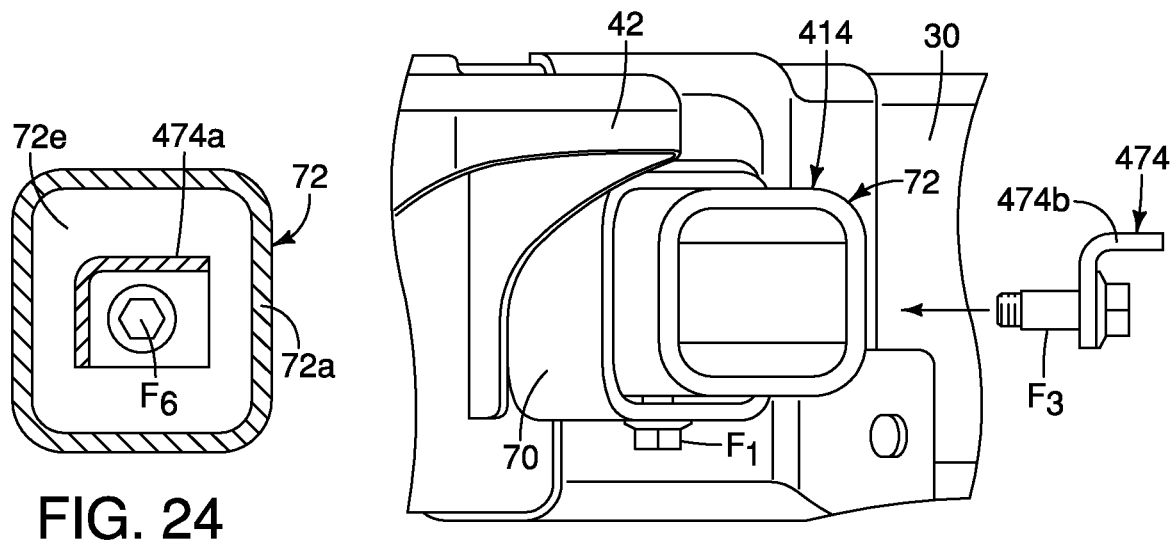
FIG. 24
FIG. 25

United States Patent — US 10,526,017 B2

VEHICLE BODY STRUCTURE

BACKGROUND

Field of the Invention

The present invention generally relates to a vehicle body structure. More specifically, the present invention relates to an off-center support structure attached to portions of a vehicle frame that responds to and absorbs impact force during an off-center impact.

Background Information

Vehicle structures are routinely being redesigned to include structural features that absorb impact forces in response to impact events.

SUMMARY

One object of the disclosure is to provide a vehicle frame with additional structural elements that absorb and redirect impact energy during an off-center impact.

In view of the state of the known technology, one aspect of the present disclosure is to provide a vehicle body structure with a structural member and an off-center impact structure. The structural member extends in a vehicle longitudinal direction and has a front end and a front-section extending rearward from the front end. The off-center impact structure has a first member and a second member. The first member has a linear portion and an offset portion both having a hollow interior. The linear portion extends through a first opening in the structural member in a direction perpendicular to the structural member and further extends in an outboard direction relative to the structural member. The offset portion is angularly offset from the first linear portion and extends laterally outboard and forward relative to the structural member. The second member has a first section and a second section. The first section of the second member is disposed within the hollow interior of the linear portion of the first member and the second section extends through of an opening in the first member outboard from the opening of the first member away from the hollow interior.

BRIEF DESCRIPTION OF THE DRAWINGS

Referring now to the attached drawings which form a part of this original disclosure:

FIG. 20 is a perspective view of the front side member and an off-center impact structure in accordance with a fourth embodiment;

FIG. 21 is a cross-sectional view of a first section of the second member of off-center impact structure in accordance with the fourth embodiment;

FIG. 22 is an offset, part-exploded view of the off-center impact structure looking at distal ends of the first member and the second member outboard of the front side member with the second member detached from the first member in accordance with the fourth embodiment;

FIG. 23 is a perspective view of the front side member and an off-center impact structure in accordance with a fifth embodiment;

FIG. 24 is a cross-sectional view of a first section of the second member of off-center impact structure in accordance with the fifth embodiment; and FIG. 25 is an offset, part-exploded view of the off-center impact structure looking at distal ends of the first member and the second member outboard of the front side member with the second member detached from the first member in accordance with the fifth embodiment.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
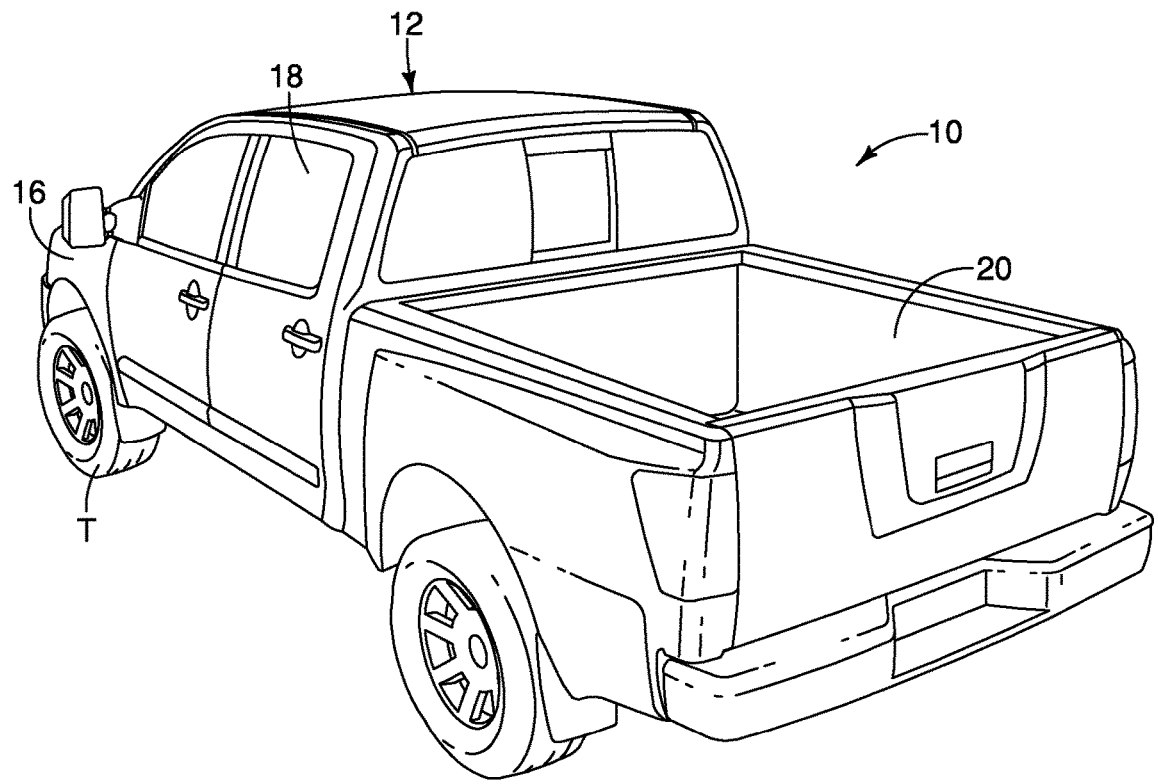
FIG. 1 is a perspective view of a vehicle having an off-center impact structure in accordance with a first embodiment.
Figure 2:
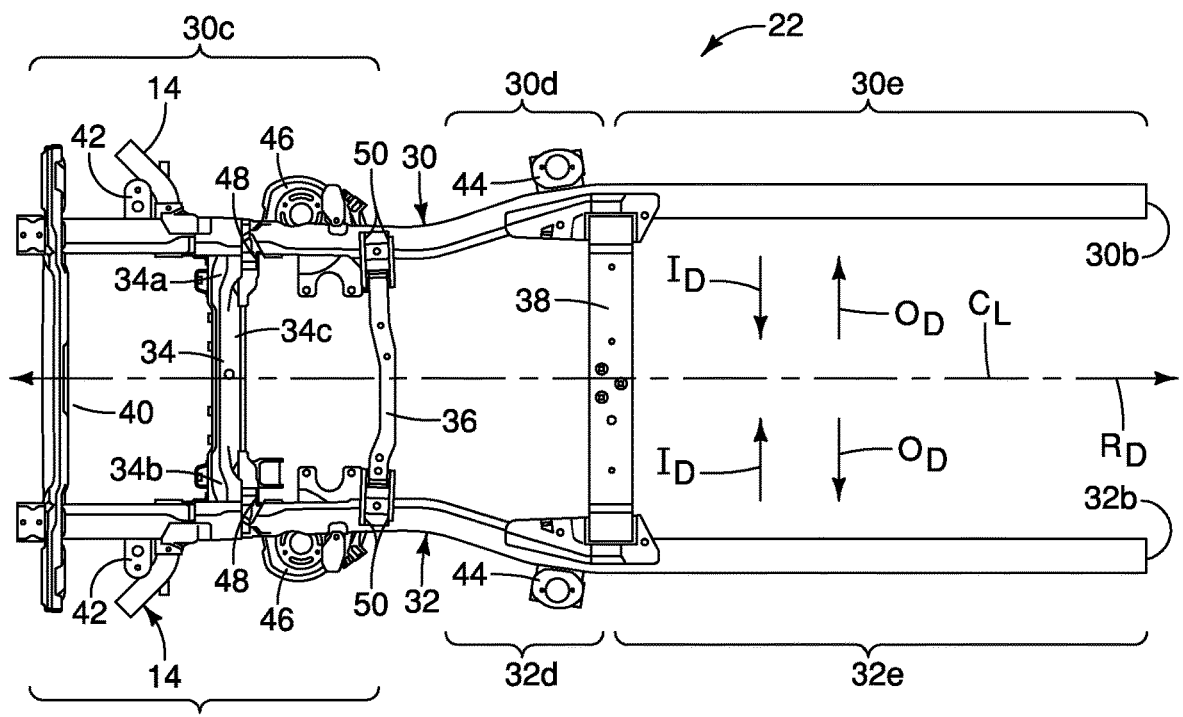
FIG. 2 is a bottom view (looking upward) of a frame from the vehicle depicted in FIG. 1, showing a pair of off-center impact structures attached to respective front side members at either side of the frame in accordance with the first embodiment.

Referring initially to FIGS. 1 and 2, a vehicle 10 with a vehicle body structure 12 that includes an off-center impact structure 14 (FIG. 2), is illustrated in accordance with a first embodiment.

Figure 3:
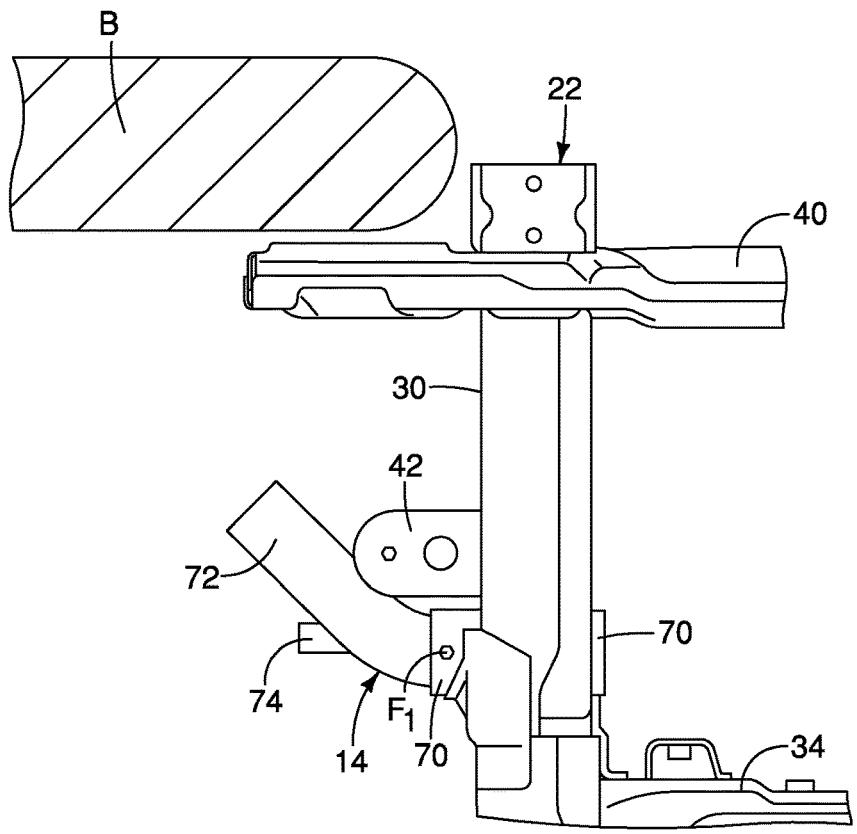
FIG. 3 is a top view of a front section of one of the front side members of the frame showing one of the off-center impact structures prior to contact with a fixed barrier in accordance with the first embodiment.
Figure 4:
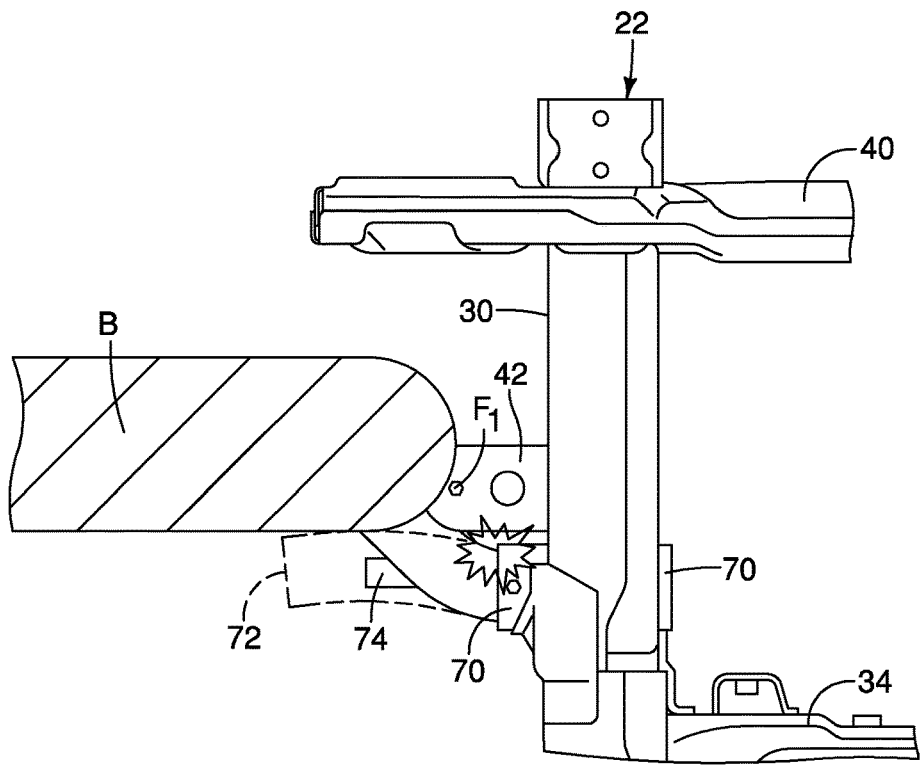
FIG. 4 is another top view of the front section of the front side member of the frame similar to FIG. 3 showing the off-center impact structure during an impact event with the fixed barrier contacting and deforming sections of the off-center impact structure in accordance with the first embodiment.

In FIG. 1, the vehicle 10 is depicted as a pickup truck that includes the vehicle body structure 12 and defines, for example, an engine compartment 16, a passenger compartment 18 and a cargo area 20. The vehicle body structure 12 is installed to and rests on a frame 22. The frame 22 and/or portions thereof are shown removed from the vehicle 10 in FIGS. 2-7. Specifically, FIG. 2 shows the frame 22 with a pair of the off-center impact structures 14 installed thereto, the off-center impact structures 14 being located on opposite sides of the frame 12. FIGS. 3 and 4 show only a front area of one side of the frame 22 with the off-center impact structure 14 installed thereto.

In FIG. 1, the depicted pickup truck that defines the vehicle 10 is a heavy-duty vehicle intended to haul large and/or heavy materials. The frame 22 is therefore a rigid, strong structure able to withstand heavy duty usage. However, it should be understood from the drawings and description herein, that the frame 22 and the off-center impact structures 14 described below can be configured for smaller vehicles or larger vehicles and is not limited to usage in a heavy-duty vehicle such as the vehicle 10.

In other words, the off-center impact structure 14 can be used on any size vehicle that includes a frame such as the frame 22 where the vehicle body structure 12 attaches to and is supported by the frame 22. It should also be understood from the drawings and description, that the off-center impact structure 14 can also be employed with a unibody vehicle. A unibody vehicle is a vehicle that does not typically includes a separate frame such as the frame 22. Rather, the unibody vehicle includes various structural elements welded together. Elements of the unibody vehicle serve as frame elements functionally equivalent to the elements of the frame 22. For example, U.S. Pat. No. 8,870,267 assigned to Nissan North America, discloses a unibody vehicle body structure. The front structural support portions (30) disclosed in U.S. Pat. No. 8,870,267 are basically vehicle side members, such as those of the frame 22 (described in greater detail below). U.S. Pat. No. 9,180,913, also assigned to Nissan North America, also discloses a unibody vehicle body structure and further discloses an engine cradle. The elements of the off-center impact structure 14 can be installed to portions of the unibody vehicle disclosed in U.S. Pat. No. 8,870,267 and portions of the engine cradle of U.S. Pat. No. 8,870,267. Both U.S. Pat. Nos. 8,870,267 and 9,180,913 are incorporated herein by reference in their entirety. Since unibody vehicles are conventional structures, further description is omitted for the sake of brevity.

In FIG. 2 several directions relative to the frame 22 (and the vehicle 10) are shown in order to define orientations of the various features of the vehicle 10 and the off-center impact structure 14. Specifically, the vehicle 10 and the frame 22 define a longitudinal center line $C_L$ that extends in a lengthwise direction of the vehicle 10 along a central portion of the vehicle 10. At a left-hand side of FIG. 2, a forward direction FD is indicated by the depicted arrow, and at a right-hand side of FIG. 2 a rearward direction $R_D$ is indicated by the depicted arrow. As well, inboard directions $I_D$ and outboard directions $O_D$ relative to the longitudinal center line $C_L$ are also shown in FIG. 2.

As shown in FIG. 2, the frame 22 includes a front side member 30, a second side member 32, a first cross-member 34, a second cross-member 36 and a third cross-member 38 and a front cross-member 40. FIG. 2 shows an underside of the frame 22. In other words, the depiction of the frame 22 is taken from below the frame 22 looking upward. The frame 22 is made of heavy gauge steel, but can alternatively be made of other materials depending upon the overall design of the vehicle 10. It should therefore be understood that the front side member 30 extends along and under a driver's side of the vehicle 10, and the second side member 32 extends along and under a passenger's side of the vehicle 10.

The front side member 30 is an elongated beam (also referred to as a structural member) that has multiple contours and shapes. Specifically, the front side member 30 has a front end 30a and a rear end 30b. The front side member 30 also has a first portion 30c, a second portion 30d and a third portion 30e. The first portion 30c extends in the rearward direction $R_D$ from the front end 30a to a location proximate the second cross-member 36. The first portion 30c is generally straight. The second portion 30d has a curved shape such that just rearward of the first portion 30c, the second portion 30d gradually curves in the outboard direction $O_D$. The third portion 30e is generally straight, but can include contours and curves, depending upon the overall design of the vehicle 10.

Similarly, the second side member 32 is an elongated beam (a second side member) that has multiple contours and shapes that are symmetrical to the front side member 30. Specifically, the second side member 32 has a front end 32a and a rear end 32b. The second side member 32 also has a first portion 32c, a second portion 32d and a third portion 32e. The first portion 32c extends in the rearward direction Ro from the front end 32a to a location proximate the second cross-member 36. The first portion 32c is generally straight. The second portion 32d has a curved shape such that just rearward of the first portion 32c, the second portion 32d gradually curves in the outboard direction $O_D$.

The first portions 30c and 32c of the first and second side members 30 and 32 are a first distance away from one another, and the third portions 30e and 32e are a second distance away from one another, with the second distance being greater than the first distance.

Figure 6:
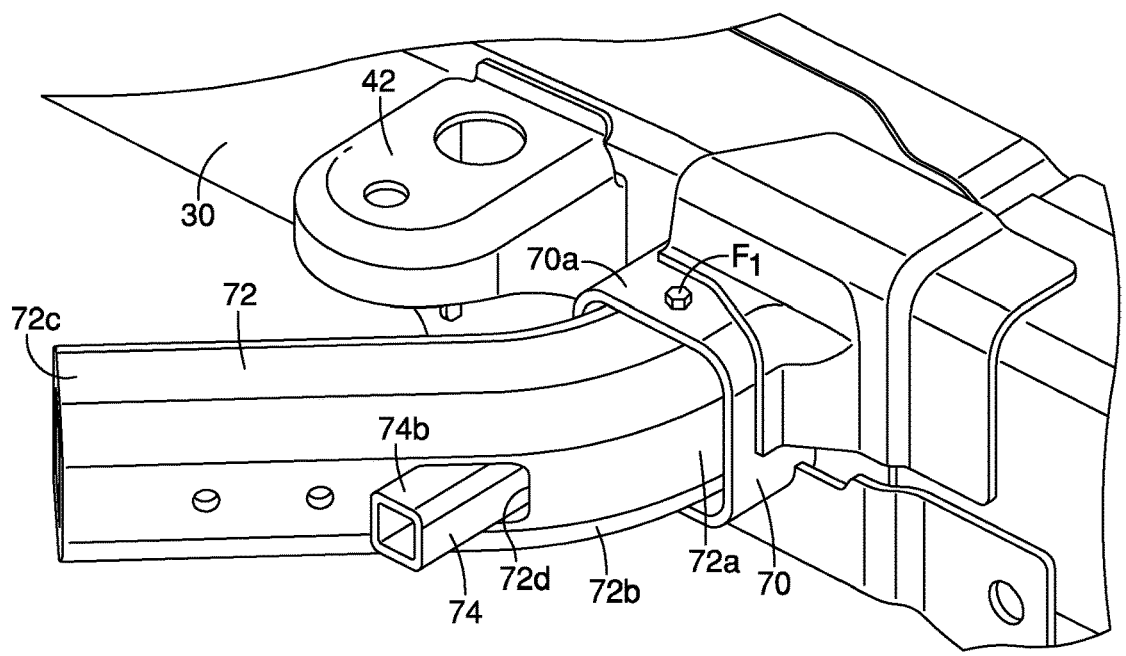
FIG. 6 is a perspective view of the front section of the front side member of the frame depicted in FIG. 3 showing a sleeve, the first member and the second member of the off-center impact structure in accordance with the first embodiment.
Figure 7:
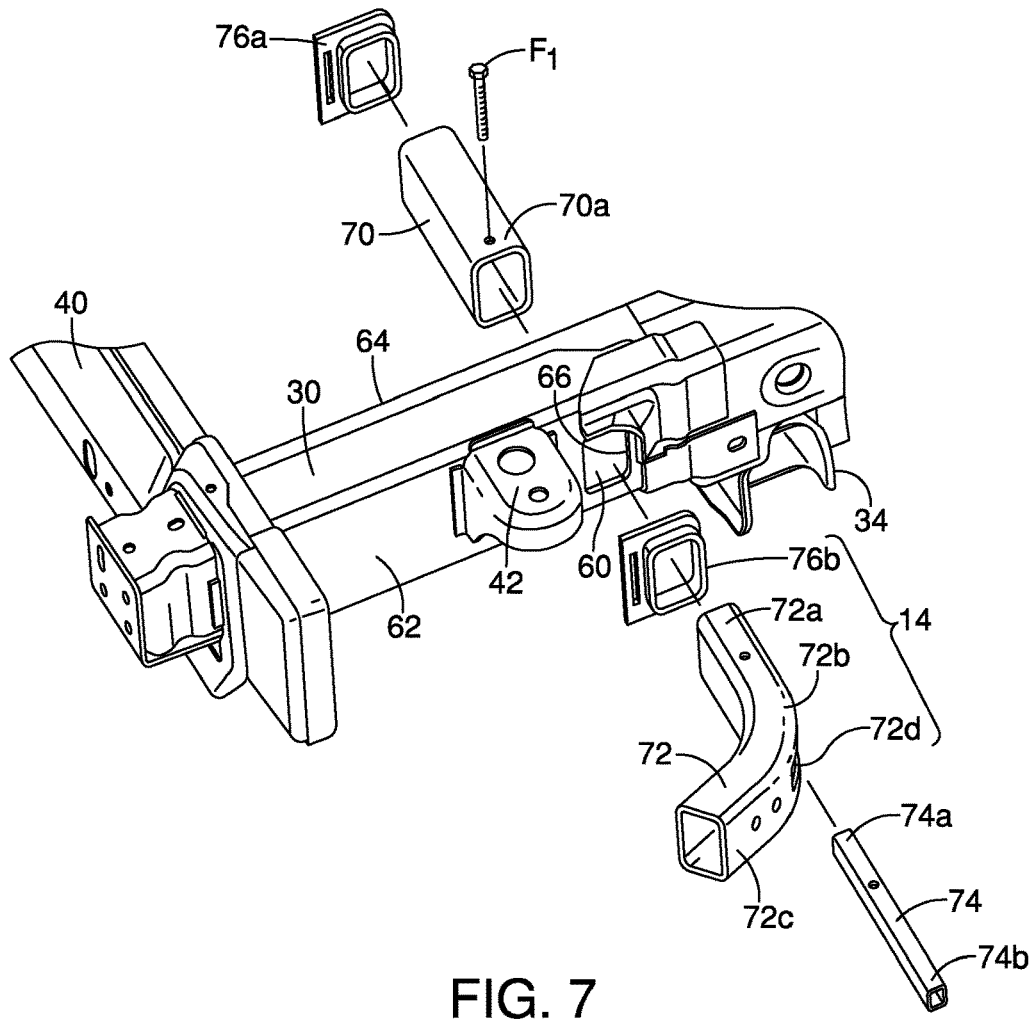
FIG. 7 is an exploded perspective view of the front section of the front side member of the frame depicted in FIG. 3 showing the sleeve, the first member and the second member of the off-center impact structure separated from one another in accordance with the first embodiment.

The first and second side members 30 and 32 each include body attachment structures 42 and 44 (also referred to as attachment flanges). The body attachment structures 42 and 44 are welded to the first and second side members 30 and 32 and are dimensioned and shaped to attach to the vehicle body structure 12 of the vehicle 10. The body attachment structures 42 extend from outboard sides of the first portions 30c and 32c of the first and second side members 30 and 32 forward of the first cross-member 34. The body attachment structures 44 extend from outboard sides of the second portions 30d and 32d of the first and second side members 30 and 32 rearward of the second cross-member 36. As shown in FIG. 6, the body attachment structures 42 extend above a portion of the off-center impact structures 14. FIGS. 2-4 make it appear that the off-center impact structures 14 and the body attachment structures 42 contact one another outboard of the frame 22. However, this is not the case. The off-center impact structures 14 and the body attachment structures 42 do not contact one another and are spaced apart from one another, as shown in FIG. 6.

Although not shown in FIG. 2, the third portions 30e and 32e of the first and second side members 30 and 32 can also include additional body attachment structures (not shown) configured for attachment to structures that define the cargo area 20 of the vehicle 10. Further, the third portions 30e and 32e can be at the same level above the ground as the first portions 30c and 32c, or, can be raised above the ground at a level higher that the first portions 30c and 32c, with the second portions 30d and 32d including an upward curvature.

As shown in FIG. 2, each of the first portions 30c and 32c of the first and second side members 30 and 32 further include front suspension structures such as coil spring supports 46, first suspension structures 48 and second suspension structures 50.

The coil spring supports 46 are rigidly fixed (i.e. welded) to respective ones of the first and second side members 30 and 32. The coil spring supports 46 are dimensioned and shaped to support lower ends of front suspension coil springs in a conventional manner. Since front suspension coil springs are conventional structures, further description is omitted for the sake of brevity.

The first suspension structures 48 and the second suspension structures 50 are configured to support a lower control arm (not shown) for pivotal movement about pivot bolts 54. The lower control arm is part of the steering and suspension structure of the vehicle 10. Since steering and suspension structures (and, in particular, control arm structures) are conventional vehicle components, further description is omitted for the sake of brevity.

The engine compartment 16 of the vehicle body structure 12 is approximately located in the space above and between the first portions 30c and 32c of the first and second side members 30 and 32. A front portion of the passenger compartment 18 is located in the space above and between the second portions 30d and 32d of the first and second side member rearward of the engine compartment 16. The remainder of the passenger compartment 18 and the cargo area 20 of the vehicle body structure 12 are located above the third portions 30e and 32e of the first and second side members 30 and 32.

As shown in FIGS. 2-4, the first cross-member 34 is rigidly attached to the front side member 30 and rigidly attached to the second side member 32. The first cross-member 34 can be co-planar with the first and second side members 30 and 32, or can be located above or below the first and second side members 30 and 32. The first cross-member 34 has a first end 34a, a second end 34b and mid-section 34c that extends from the first end 34a to the second end 34b. The first end 34a of the first cross-member is fixed to the front side member 30.

In the depicted embodiment, the first cross-member 34 extends in a vehicle lateral direction from the first portion 30c of the front side member 30 to the first portion 32c of the second side member 30 at a location rearward of the front ends 30a and 32a. The first cross-member 34 is further rigidly fixed to each of the front side member 30 and the second side member 32. As shown in FIGS. 2-4, the first cross-member 34 extends perpendicular to the first portion 30c of the front side member 30 and the first portion 32c of the second side member 32.

The second end 34b of the first cross-member 34 is also fixed to the second side member 32 in a manner consistent with the attachment of the first end 34a to the front side member 30. Since the attachment of the second end 34b to the second side member 32 is basically the same as the attachment of the first end 34a to the front side member 30, further description of the attachment of the first cross-member 34 to the second side member 32 is omitted for the sake of brevity.

The second cross-member 36 extends in the vehicle lateral direction and is rigidly fixed to areas of each of the front side member 30 and the second side member 32 rearward of the first cross-member 34. The second cross-member 36 can be welded to each of the first portions 30c and 32c of the first and second side members 30 and 32. However, the second cross-member 36 can be attached to the first and second side members 30 and 32 via mechanical fasteners (not shown).

An engine receiving space is defined in the area confined between the first and second side members 30 and 32, and between the first and second cross-members 34 and 36.

The third cross-member 38 extends between forward ends of each of the third portions 30e and 32e of the first and second side members 30 and 32. The third cross-member 38 is welded to each of the first and second side members 30 and 32 and can serve as an attachment structure for a rear portion of the vehicle body structure 12 (at a mid-portion of the passenger compartment 18), and/or can serve as an attachment structure for the structure that defines the cargo area 20.

The front cross-member 40 is welded or otherwise rigidly fixed to the front ends 30a and 32a of the first and second side members 30 and 32. A bumper structure (not shown) can be attached to the front cross-member 40. Alternatively, the bumper structure (not shown) can be attached to the front ends 30a and 32a of the first and second side members 30 and 32 replacing the front cross-member 40.

The front cross member 40 is attached to the front side member 30 at or adjacent to the front end 30a of the front side member 30. The front cross member 40 includes an outboard portion 40a that extends from the front side member 30 forward of the off-center impact structure 14 in the outboard direction $O_D$. In response to an impact event of an off-center impact test, the outboard portion 40a of the front cross member 40 deforms and can contact a portion of the off-center impact structure 14, as described in greater detail below.

A description of a first embodiment of the off-center impact structure 14 is now provided with specific reference to FIGS. 3-9.

As is shown in FIG. 2, one of the off-center impact structures 14 is installed to the front side member 30 and another one of the off-center impact structures 14 is installed to the front side member 32. The two off-center impact structures 14 are symmetrically arranged relative to the longitudinal center line $C_1$ of the vehicle 10. The two off-center impact structures 14 are basically identical, except that they are mirror images of one another. Consequently, description of one of the off-center impact structures 14 applies equally to the other. Therefore, only one of the off-center impact structures 14 is described herein below for the sake of brevity.

Each of the elements and structures that define the off-center impact structure 14 is couple to, connected to, supported to or otherwise fixedly attached to the front side member 30, as shown in FIGS. 2-7.

As shown in FIGS. 3 and 4, the off-center impact structure 14 is configured to absorb impact energy in response in response to contact with a fixed barrier B with the vehicle 10 in motion. Specifically, FIG. 3 shows the off-center impact structure 14 just prior to impact and FIG. 4 shows the off-center impact structure 14 during an impact. The off-center impact structure 14 absorbs energy by deforming in a manner described in greater detail below.

Figure 5:
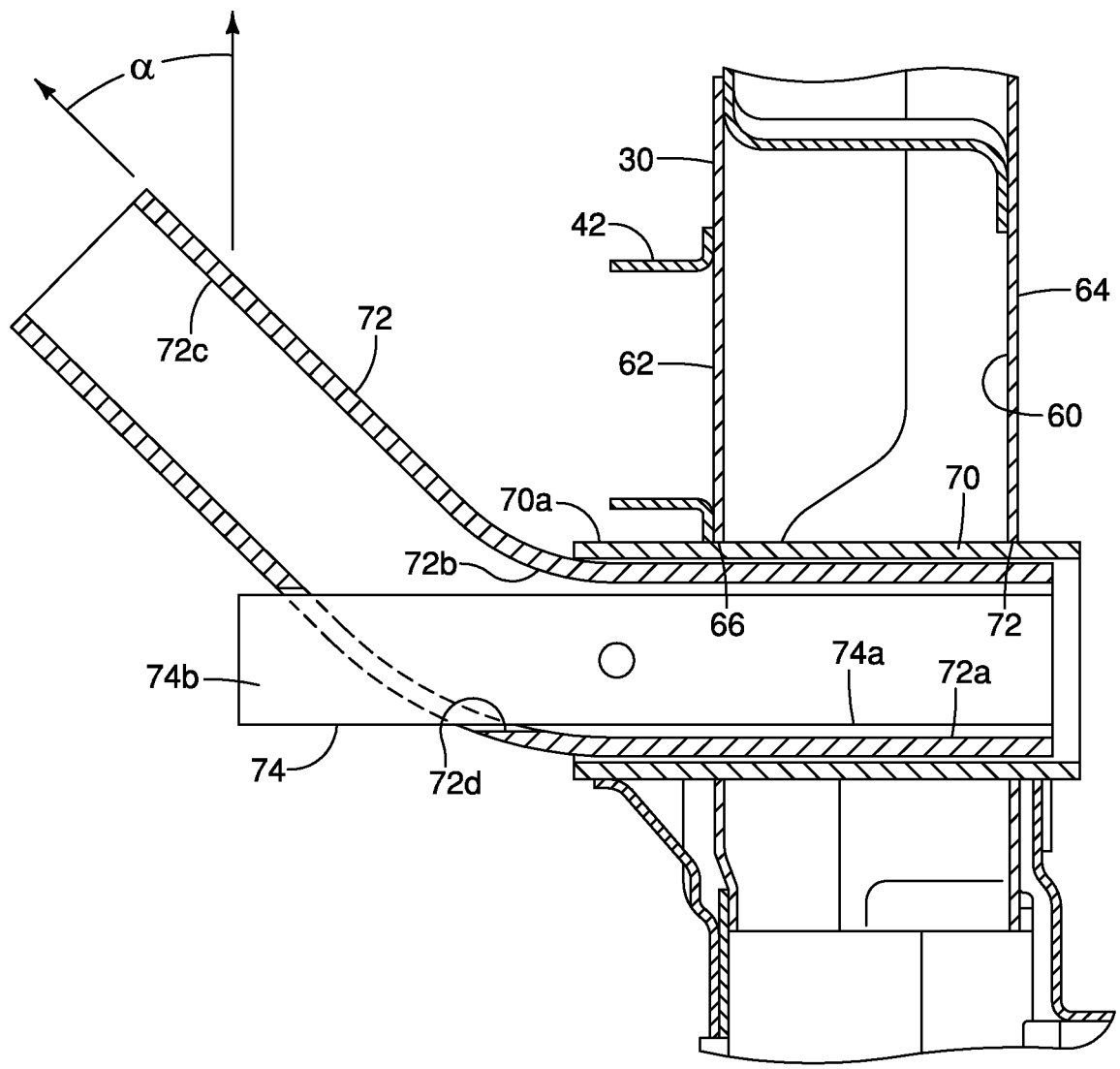
FIG. 5 is a cross-sectional view of the front section of the front side member of the frame depicted in FIG. 3 showing a first member and a second member of the off-center impact structure in accordance with the first embodiment.

In the depicted embodiment, as shown in FIG. 5, the front side member 30 defines a hollow interior 60. The first portion 30c (a forward portion) of the side member 30 extends in a rearward direction from the front end 30a of the front side member 30 in a vehicle longitudinal direction parallel to the longitudinal center line $C_1$ and has an outboard wall 62 and an inboard wall 64.

The outboard wall 62 defines an outboard opening 66 that extends through the outboard wall 62 and to the hollow interior 60. The inboard wall 64 of the front side member 30 defines an inboard opening 72 that is aligned with the outboard opening 66 in the inboard directions $I_D$ and the outboard directions $O_D$ (lateral directions) of the front side member 30. As shown in FIG. 5, the outboard opening 66 and the inboard forward opening 72 are located rearward of the body attachment structure 42 and forward of the first cross-member 34. The body attachment structure 42 is attached to the outboard wall 62 of the front side member 30 along the front portion 32 (the front-section) rearward of the outboard opening 66 via, for example, welding techniques.

The off-center impact structure 14 basically includes a sleeve 70, a first member 72, and a second member 74.

As shown in FIG. 5, the sleeve 70 is a hollow beam member with open ends that expose a hollow interior of the sleeve 70. The sleeve 70 is an optional element and, in some vehicle design applications, can be omitted from the off-center impact structure 14. The sleeve 70 is inserted through the outboard opening 66 through the hollow interior 60 and to the inboard opening 72 of the front side member 30. A portion 70a of the sleeve 70 extends laterally outward in the outboard direction $O_D$ from the outboard wall 62. The sleeve 70 basically defines a tunnel through the front side member 30. The sleeve 70, like the front side member 30, is preferably made of a metallic material such as steel and is fixedly attached to the outboard wall 62 and the inboard wall 64. For example, the sleeve 70 can be welded directly to the outboard wall 62 and directly welded to the inboard wall 64, but, can alternatively be attached to the front side member 30 via mechanical fasteners. Further, optional retaining collars 76a and 76b (shown in FIG. 7) can optionally be employed to align and secure the sleeve 70 to the front side member 30, in a manner consistent with the disclosure of U.S. Ser. No. 15/485,991, filed Apr. 12, 2017, now U.S. Pat. No. 9,908,564, issued Mar. 6, 2018. The disclosure of U.S. Pat. No. 9,908,564 is incorporated herein by reference in its entirety.

As shown in FIGS. 3-6, the portion 70a of the sleeve 70 extends laterally outward from the outboard wall 62.

As shown in FIG. 2-9, the first member 72 is has a linear first end portion 72a (also referred to as a linear portion), a curved mid-portion 72 and a second end portion 72c (also referred to as an offset portion). The first end portion 72a of the first member 72 is inserted into the hollow interior of the sleeve 70 and consequently also extends through the outboard opening 66 into the hollow interior of the front side member 30. The linear first end portion 72a is perpendicular or approximately perpendicular to the first side member 30. A fastener $F_1$ extends through an opening in the sleeve 70 and a corresponding opening in the first member 72 securing the first member 72 to the sleeve 70 and hence to the first side member 30. The curved mid-portion 72b is located outboard of the sleeve 70 and the outboard wall 62 and curves toward a forward direction. The second end portion 72c is linear and extends from the curved mid-portion 72b in the outboard direction and a forward direction away from the outboard wall 62 of the front side member 30. Hence the second end portion 72c (the offset portion) is angularly offset from the front side member 30 (the structural member) defining an angle $\alpha$ (FIG. 5). The angle $\alpha$ can be any value between 30 and 60 degrees. However, in the depicted embodiment the angle $\alpha$ has a value of approximately 45 degrees.

The first member 72 includes an opening 72d located along a section of the curved mid-portion 72b and extending along a section of the second end portion 72c. The opening 72d does not extend to a distal end of the second end portion 72c, as shown in FIGS. 5-8.

Figure 8:
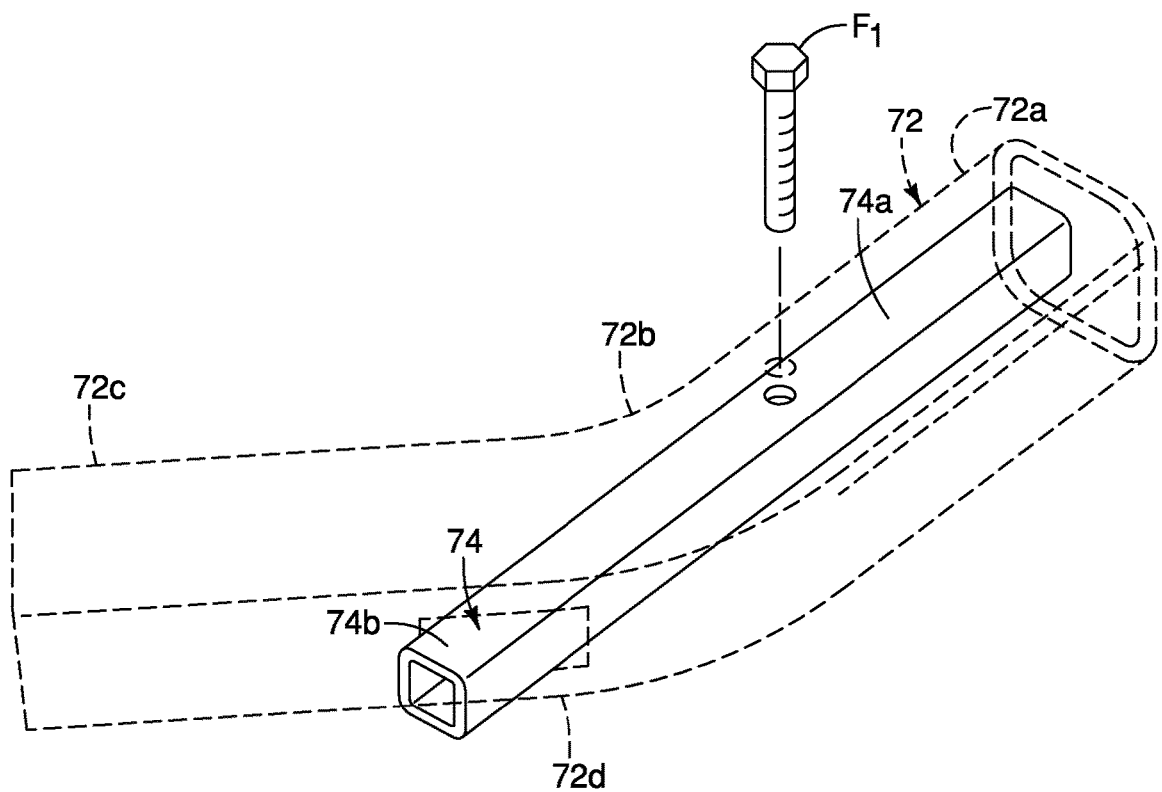
FIG. 8 is a perspective view of the first member (in phantom lines) and the second member of the off-center impact structure in accordance with the first embodiment.

As shown in FIGS. 5 and 8, the second member 74 has a first section 74a and a second section 74b. The first section 74a of the second member 74 is disposed within the hollow interior of the linear first end portion 72a of the first member 72. The second section 74b of the second member 74 extends through of the opening 72d in the first member 72 and further extends outboard from the opening 72d away from the hollow interior of the first member 72 and further outboard of the first side member 30. The first section 74a and the second section 74b of the second member 74 extend linearly with respect to one another and define a hollow interior thereof. In other words, the second member 74 is a straight linear element. Further, the first and second sections 74a and 74b of the second member 74 extend in a direction perpendicular to the front side member 30 (the structural member).

Figure 9:
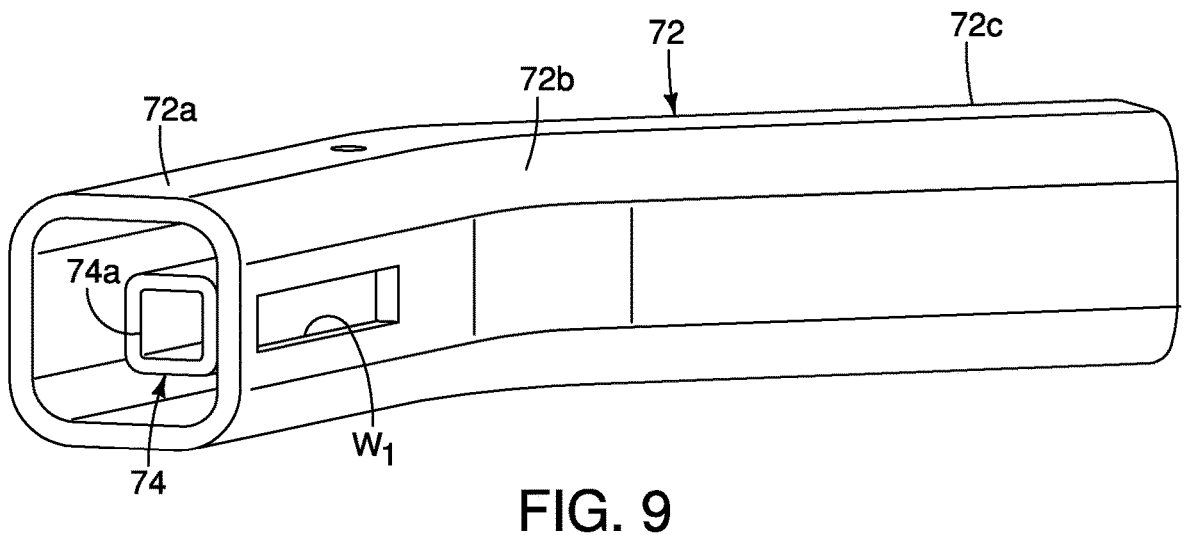
FIG. 9 is another perspective view of the first member and the second member of the off-center impact structure in accordance with the first embodiment.
Figure 10:
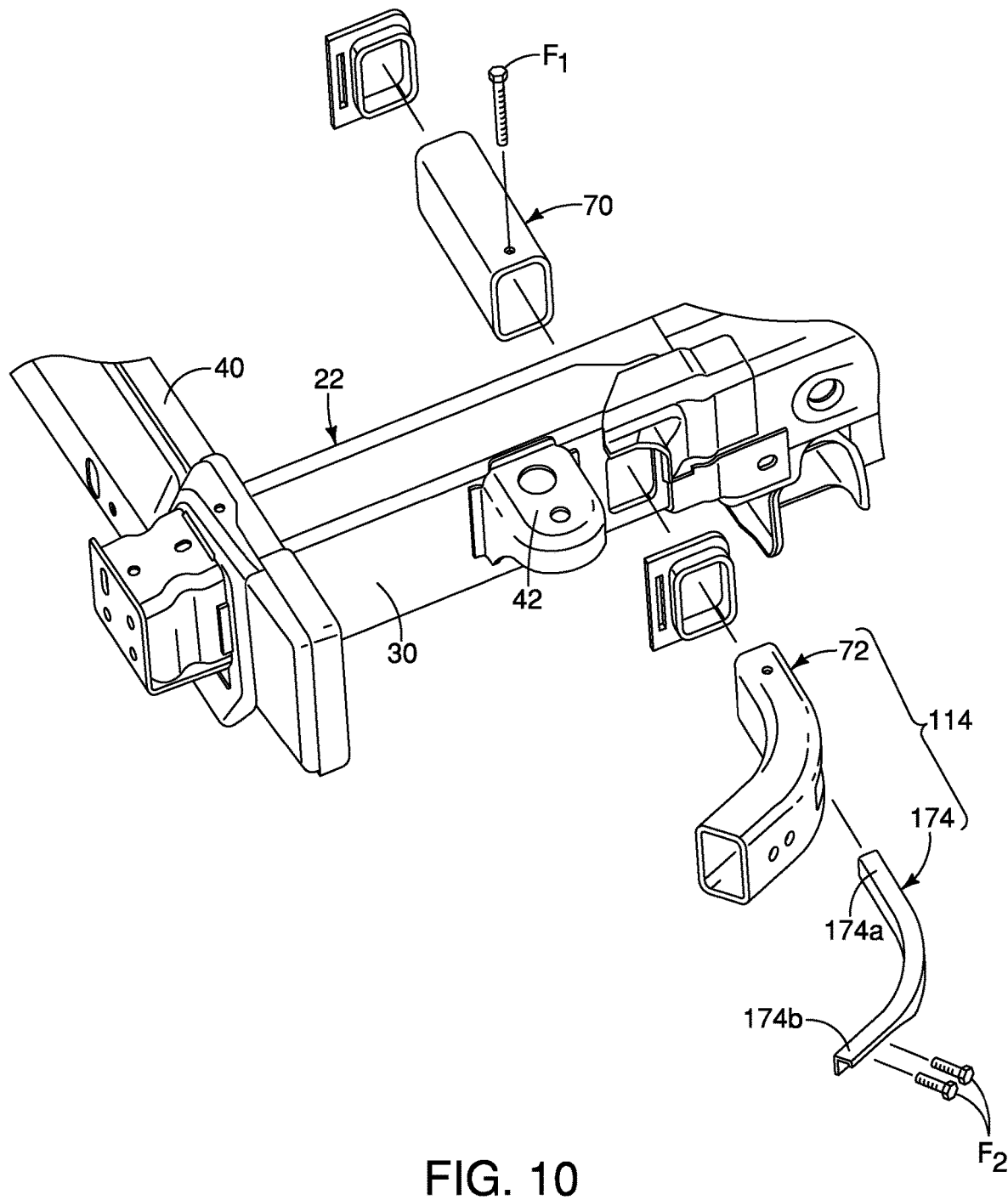
FIG. 10 is an exploded perspective view of the front section of the front side member of the frame depicted showing the sleeve, the first member and a second member of an off-center impact structure separated from one another in accordance with a second embodiment.
Figure 11:
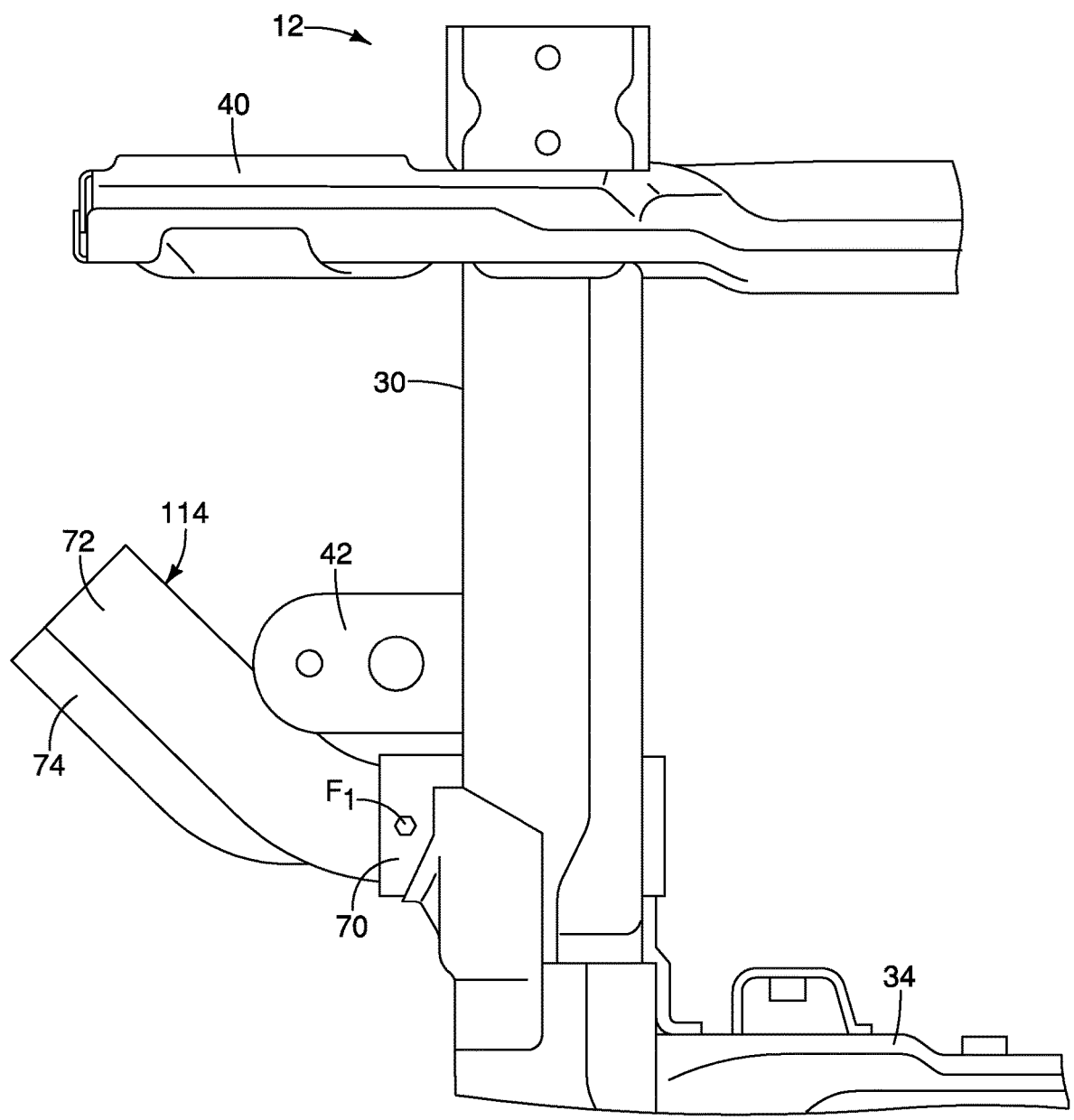
FIG. 11 is a top view of the front section of the front side member of the frame depicted in FIG. 10 showing the off-center impact structure in accordance with the second embodiment.

The second member 74 can be fixed to the interior of the first member 72 via, for example, fasteners (not shown) or welding techniques. For example, as shown in FIG. 9, the first section 74a can be welded to a portion of the second end portion 72a of the first member 72 via a welding window $W_1$ shown in FIG. 9. Further, as indicated in FIGS. 2-4 and 6-8, the fastener $F_1$ can further extend through the opening in the sleeve 70, through the opening in the first member 72 and further through an opening in the second member 74.

As shown in FIGS. 3 and 4, during an impact event where the vehicle 10 (with the frame 22), the fixed barrier B contacts the second end portion 72c of the first member 72. As the impact event progresses, the first member 72 can deform, as shown in FIG. 4. After a certain amount of deformation during which impact energy is absorbed, the first member 72 bends into direct contact with the second section 74b of the second member 74. Thereafter, the second member 74 can begin to deform thereby absorbing impact energy transmitted through the first member 72 to the second member 74.

One effect of the inclusion of the second member 74, is the further absorption of impact energy from the deformed first member 72. Specifically, the first member 72 absorbs a second predetermined level of impact energy during deformation thereof. After initial deformation of the first member 72, the second member 74 in its non-impacted state has a potential for absorbing a second predetermined level of impact energy. If there is sufficient force in the impact event to deform the second member 74, the second predetermined level of impact energy absorbed during deformation of the second member 74 is enhanced by continued energy absorbing deformation of the first member 72, as well as friction between contacting surfaces of the first member 72 and the second member 74. Hence, the overall level of impact energy that can potentially be absorbed by the off-center impact structure 14 is greater than the combination of the first predetermined level of impact force and the second predetermined level of impact energy, as compared to the level of impact force that can be absorbed by the first member 72 measured alone, combined with the level of impact force that can be absorbed by the second member 74, measured alone.

Further, the first member 72 absorbs energy first by experiencing significant amounts of deformation prior to the second member 74 beginning to absorb impact energy and beginning to deform. Accordingly, the off-center impact structure 14 provides a multi-step progression of impact energy absorption that reduces the impact energy absorbed by the remainder of the frame 22 due to, first deformation of the first member 72, and thereafter, deformation of the second member 74.

Second Embodiment

Referring now to FIGS. 10-18, an off-center impact structure 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The off-center impact structures 114 completely replaces the off-center impact structures 14 of the first embodiment. Further, the off-center impact structure 114 is installed to the sleeve 70 (and the front side member 30) in a manner that is identical to that of the installation of the off-center impact structure 14 to the sleeve 70 (and the front side member 30) in the first embodiment.

The off-center impact structure 114 includes the sleeve 70 (as in the first embodiment), the first member 72 (as in the first embodiment) and a second member 174 that replaces the second member 74 of the first embodiment.

Figure 12:
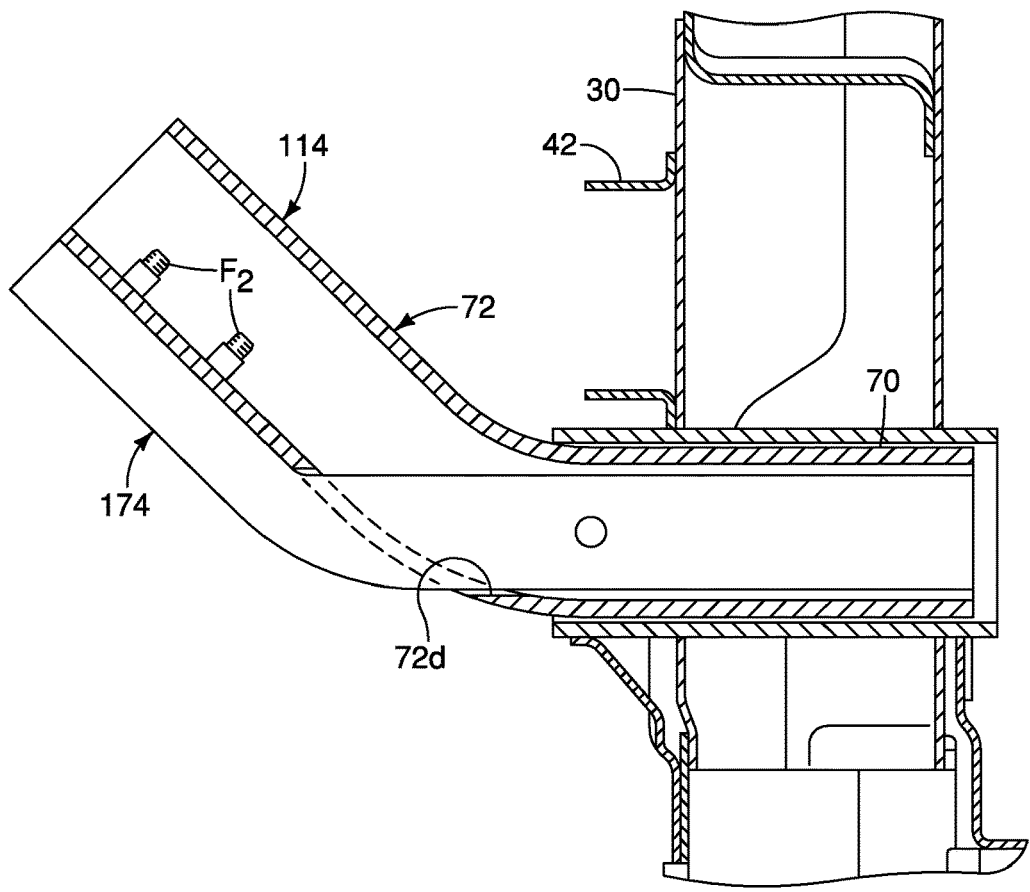
FIG. 12 is a top cross-sectional view of the front section of the front side member of the frame depicted in FIG. 11 showing the off-center impact structure in accordance with the second embodiment.
Figure 13:
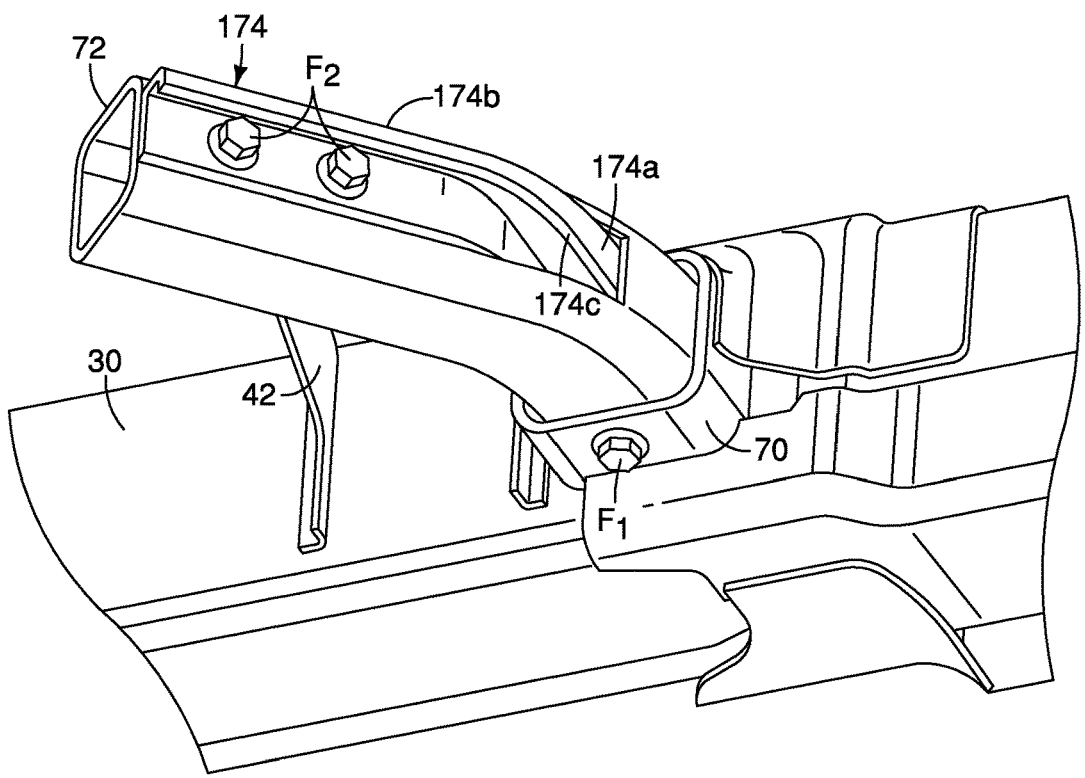
FIG. 13 is a perspective view of the front section of the front side member of the frame showing the sleeve, the first member and the second member of the off-center impact structure in accordance with the second embodiment.
Figure 14:
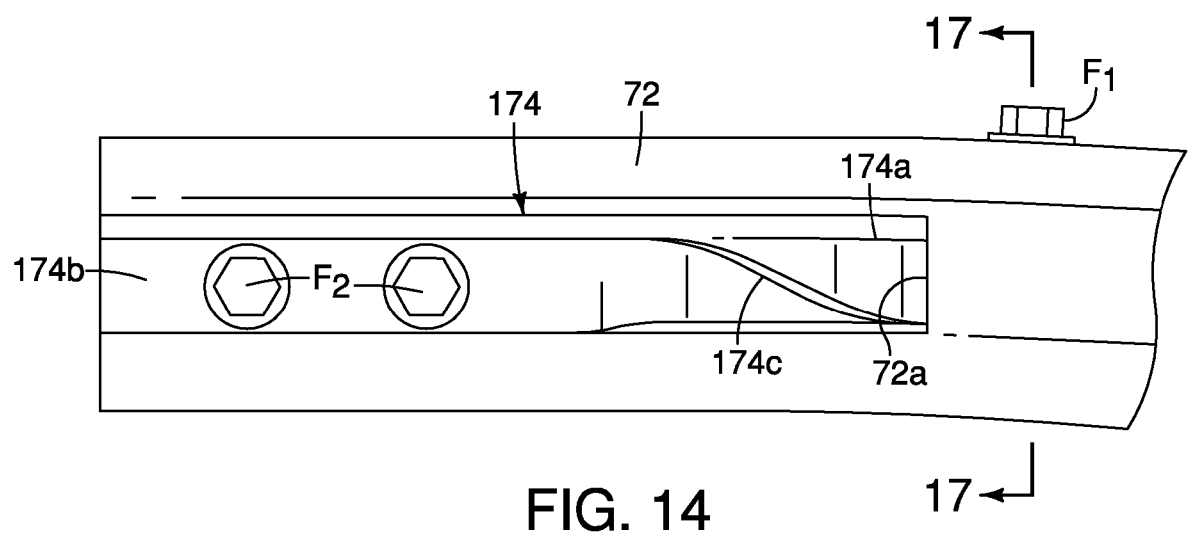
FIG. 14 is a rear view of the off-center impact structure showing the second member extending out of an opening in the first member with a section of the second member extending along a rearward surface of a section of the first member in accordance with the second embodiment.
Figure 15:
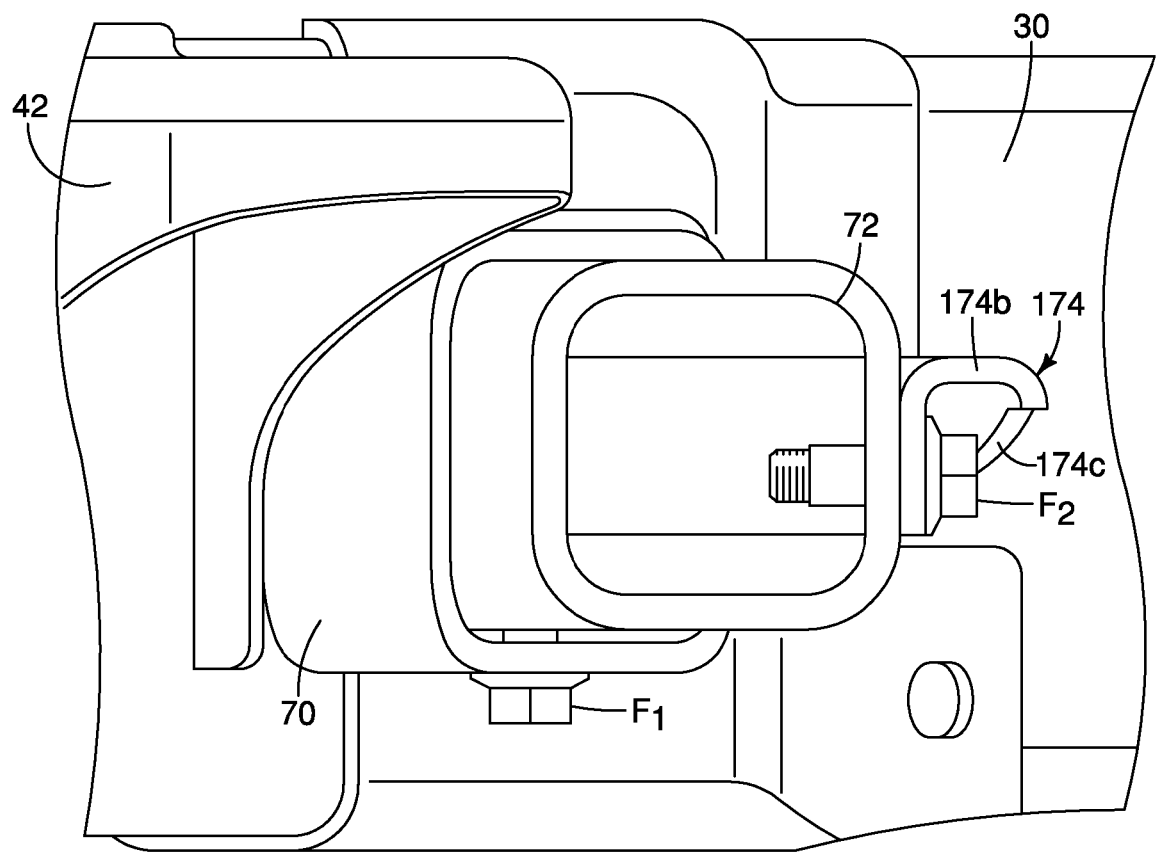
FIG. 15 is an offset view of the off-center impact structure looking at distal ends of the first member and the second member outboard of the front side member in accordance with the second embodiment.
Figure 16:
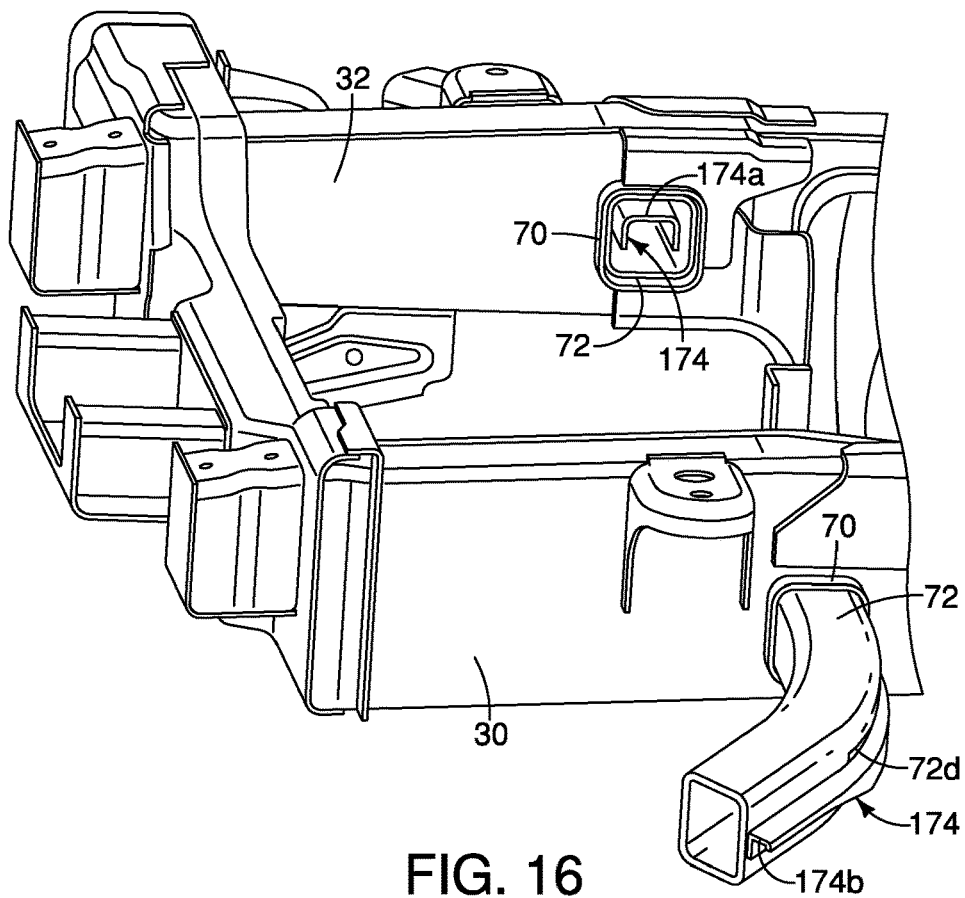
FIG. 16 is a perspective view of the front section of the front side member of the frame showing the sleeve, the first member and the second member of the off-center impact structure in accordance with the second embodiment.
Figure 17:
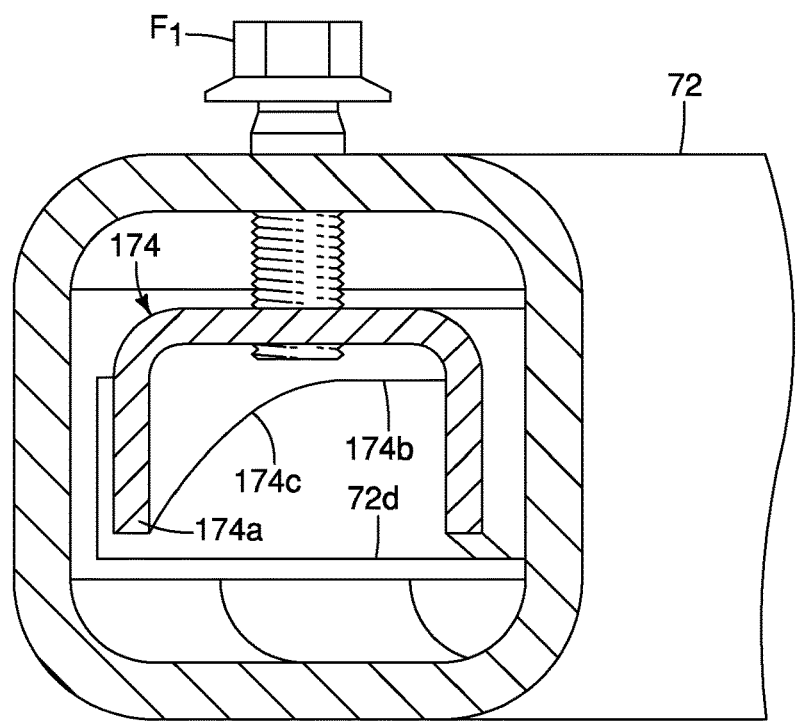
FIG. 17 is a cross-sectional view of the off-center impact structure taken along the line 17-17 in FIG. 14 in accordance with the second embodiment.
Figure 18:
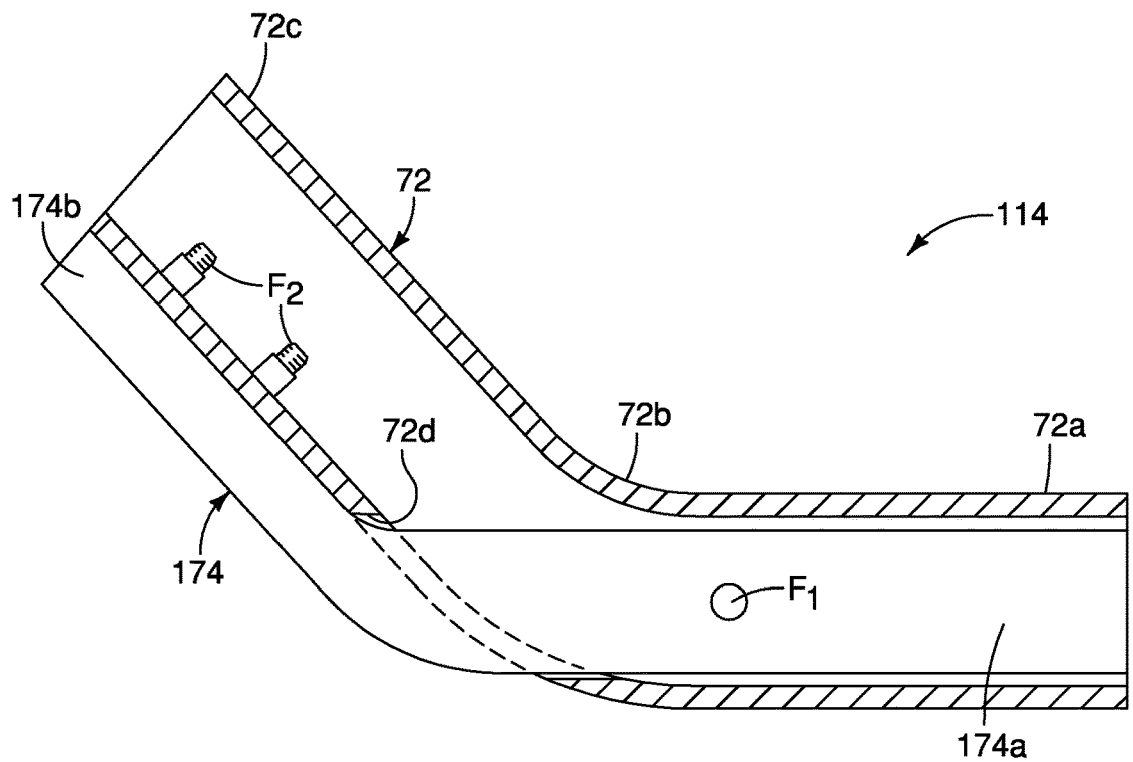
FIG. 18 is a top cross-sectional view of the first member and the second member of the off-center impact structure in accordance with the second embodiment.

The second member 174 includes a first section 174a and a second section 174b. The second section 174b of the second member 174 is angularly offset from the first section 174a of the second member 174 such that the second section 174b extends laterally outboard and forward from the first section 174a. The first section 174a of the second member 174 is has an inverted U-shape, as shown in FIG. 16 as viewed from an inboard end thereof. The first section 174a is inserted into the first member 72 through the opening 72d, as shown in FIGS. 10 and 12-17. A second section 174b of the second member 174 includes a cut-away 174c such that the second section 174b has an inverted L-shape, as viewed in cross-section or at a distal end thereof, as shown in FIGS. 15 and 16. In the second embodiment as shown in FIGS. 12-14, the second section 174b is fixedly attached to the second end portion 72c of the first member 72 by a pair of fasteners $F_2$, as shown in FIGS. 10 and 12-15. As shown in FIG. 17, the first section 174a of the second member 174 is attached to the sleeve 70 and the first member 72 via the fastener $F_1$. The fastener $F_1$ can have two threaded sections, a smaller diameter threaded section threads into the first section 174a of the second member 174, and a large diameter threaded section threads into the first member 72. This arrangement maintains the second member 174 in a spaced apart relationship with the inner surfaces of the first member 72, which enhances the impact energy absorbing characteristics of the off-center impact structure 114.

The impact energy absorbing characteristics of the off-center impact structure 114 are similar to that of the off-center impact structure 14 of the first embodiment in that the presence and configuration of the second member 174 complements the impact energy absorbing properties of the first member 72, thereby increasing the overall level of absorbed impact energy. More specifically, at least a portion of the first member 72 deforms absorbing impact energy in an impact event prior to impact energy being absorbed by the second member 174. Further, the first member 72 deforms prior to a point where impact energy can begin to deform the second member 174. Accordingly, the off-center impact structure 114 provides a multi-step progression of impact energy absorption that reduces the impact energy absorbed by the remainder of the frame 22 due to, first deformation of the first member 72, and thereafter, deformation of the second member 174.

Third Embodiment

Figure 19:
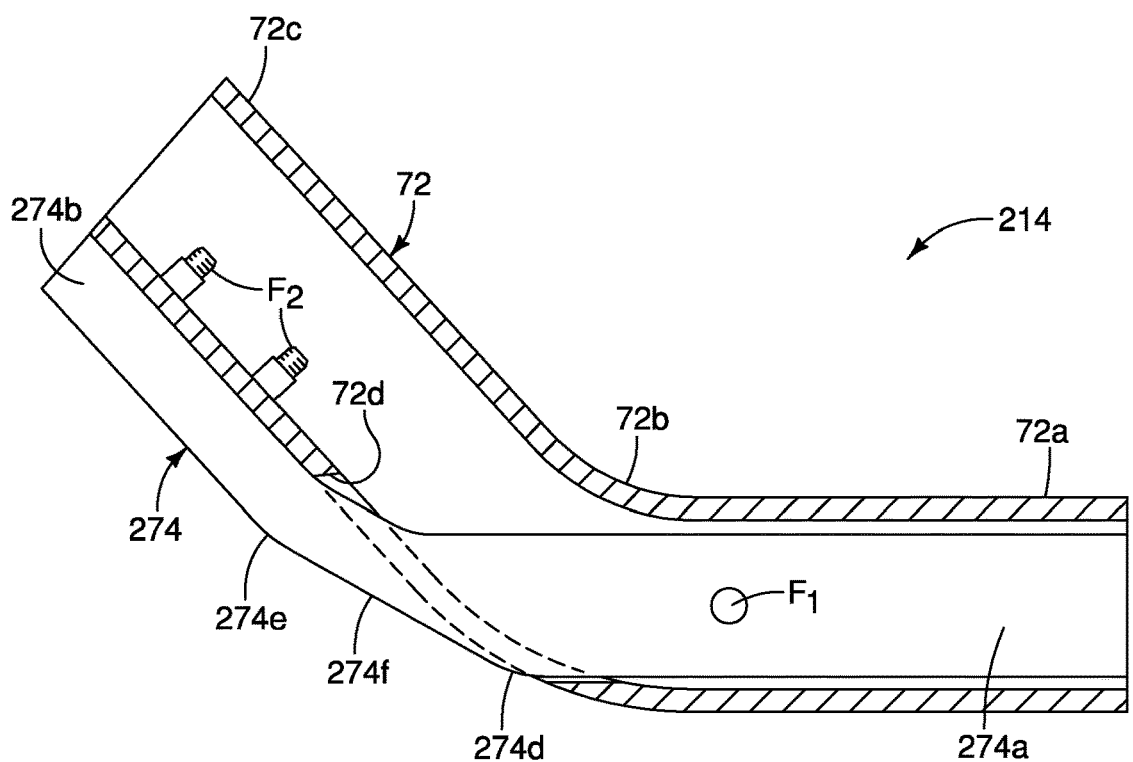
FIG. 19 is a top cross-sectional view of the first member and a second member of an off-center impact structure in accordance with a third embodiment.

Referring now to FIG. 19, an off-center impact structure 214 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The off-center impact structures 214 replaces the off-center impact structure 14 of the first embodiment. Further, the off-center impact structure 114 is installed to the sleeve 70 (and the front side member 30) in a manner that is identical to that of the installation of the off-center impact structures 14 to the sleeve 70 (and the front side member 30) in the first embodiment.

The off-center impact structure 214 includes the sleeve 70 (as in the first embodiment), the first member 72 (as in the first embodiment) and a second member 274 that replaces the second member 74 of the first embodiment.

The second member 274 includes a first section 274a, a second section 274b, a cutaway portion (not shown) that is identical to the cutaway 174c of the second embodiment, a first curved portion 274d, a second curved portion 274e and a straight portion 274f that extends between the first curved portion 274d and the second curved portion 274e.

The second member 274 is very similar to the second member 174 of the second embodiment in that the second section 274b is fixed to the first member 72 via fasteners $F_2$.

However, the inclusion of the first curved portion 274d and the second curved portion 274e changes the geometry of the second member 274, as compared to the second member 174 of the second embodiment. Specifically, the straight portion 274f is angularly offset from the first section 274a, and, the second section 274b is angularly offset from the straight portion 274f. The straight portion 274f and the first section 274a define a first obtuse angle therebetween. The second section 274b and the straight portion 274f define second obtuse angle therebetween. The first section 274a and the second section 274b define a third obtuse angle that is greater than the first obtuse angle and the second obtuse angle. Further, the third obtuse angle that equal to the sum of the first obtuse angle and the second obtuse angle.

During assembly, the second member 274 is inserted into the opening 72d of the first member 72 and attached thereto in a manner consistent with the installation of the second member 174 of the second embodiment to the first member 72. Once the second member 274 is installed to the first member 72, the second section 274b of the second member extends out of the opening 72d and along a rearward surface of the second end portion 72c (the offset portion of the first member 72).

Fourth Embodiment

Referring now to FIGS. 20-22, an off-center impact structure 314 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the off-center impact structure 314 replaces the off-center impact structure 14 of the first embodiment. The off-center impact structure 314 includes the sleeve 70 and the first member 72, as described above, and includes a second member 374 that is defined by back to back U-shaped metal beams that are bolted together by fasteners $F_4$, as shown in FIG. 21. The two U-shaped metal beams (or tow C-shaped beams) that are bent to define the second member 374 including a first section 374a and a second section 374b angularly offset from one another. The first section 374a is located within the first portion 72a of the first member 72 and the second section 374b extends out of the opening 72d of the first member 72 and extends along the second portion 72c of the first member 72.

The second member 374 is fixed to the exterior of the first member 72 by fasteners $F_5$. The second sections 374b of the second member 374 includes cut-away sections 374c that provide access to the fasteners $F_5$, and further attenuate the impact energy absorbing characteristics of the off-center impact structure 314. As shown in FIG. 22, the cut-away sections 374c provide each of the second sections 374b of the second member 374 with a L-shape.

Fifth Embodiment

Referring now to FIGS. 23-25, an off-center impact structure 414 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the off-center impact structure 414 replaces the off-center impact structure 14 of the first embodiment. The off-center impact structure 414 includes the sleeve 70 and the first member 72, as described above, and includes a second member 474 that is defined by L-shaped beam, as shown in FIGS. 22-25. L-shaped beam is bent to define the second member 474 including a first section 474a and a second section 474b angularly offset from one another. The first section 474a is located within the first portion 72a of the first member 72 and the second section 474b extends out of the opening 72d of the first member 72 and extends along the second portion 72c of the first member 72.

The second member 474 is fixed to the exterior of the first member 72 by fasteners $F_5$. As shown in FIG. 24, the first member 72 can be provided with an end plate 72e adjacent to an inboard side of the front side member 30 such that a fastener F6 fixed first section 474a to an inboard area of the first member 72.

The vehicle 10 includes conventional components that are well known in the art. Since vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
a structural member extending in a vehicle longitudinal direction and having a front end and a front-section extending rearward from the front end; and
an off-center impact structure having a first member and a second member, the first member having a linear portion and an offset portion both having a hollow interior, the linear portion extending through a first opening in the structural member in a direction perpendicular to the structural member and further extending in an outboard direction relative to the structural member, the offset portion being angularly offset from the first linear portion extending laterally outboard and forward relative to the structural member,
the second member having a first section and a second section, the first section of the second member being disposed within the hollow interior of the linear portion of the first member and the second section extending through of an opening in the first member outboard from the opening of the first member away from the hollow interior.

2. The vehicle body structure according to claim 1, wherein
the first section and the second section of the second member extend linearly with respect to one another and define a hollow interior.

3. The vehicle body structure according to claim 1, wherein
the second section of the second member is linear and extends in a direction perpendicular to the structural member.

4. The vehicle body structure according to claim 1, wherein
the second section of the second member is angularly offset from the first section of the second member such that the second section extends laterally outboard and forward from the first section.

5. The vehicle body structure according to claim 1, wherein
the second section of the second member is angularly offset from the first section of the second member, the second section extending out of the opening of the first member such that at least a portion of the second section extends along a rearward surface of the offset portion of the first member.

6. The vehicle body structure according to claim 5, wherein
the first section of the second member has a hollow interior and a portion of the second section includes a cutaway such that the portion of the second section has an inverted C-shaped cross-section.

7. The vehicle body structure according to claim 5, wherein
a portion of the first section of the second member has an inverted U-shape in cross-section.

8. The vehicle body structure according to claim 1, wherein
the second member includes a third section with the second section of the second member being angularly offset from the first section of the second member and the third section being angularly offset from the second section extending laterally outboard and forward from the second section.

9. The vehicle body structure according to claim 8, wherein
the second section of the second member extends out of the opening of the first member and the third section extends along a rearward surface of the offset portion of the first member.

10. The vehicle body structure according to claim 8, wherein
the first section and the second section of the second member define a first obtuse angle therebetween, the second section and the third section defining a second obtuse angle therebetween.

11. The vehicle body structure according to claim 1, wherein
the second member is formed from a hollow metal tube having a rectangular cross-section at the first section thereof.

12. The vehicle body structure according to claim 1, wherein
the second member is defined by a pair of elongated members, each of the pair of elongated members having an L-shape in cross-section.

13. The vehicle body structure according to claim 1, wherein
the second member is defined by a pair of elongated members, such that along the first section of the second member each of the pair of elongated members has a U-shape in cross-section and along at least a portion of the second section of the second member each of the pair of elongated members has an L-shape in cross-section.

14. The vehicle body structure according to claim 1, wherein
the structural member has a hollow interior defined between an outboard wall and an inboard wall with the first opening in the structural member being defined along the outboard wall.

15. The vehicle body structure according to claim 14, wherein
the inboard wall of the structural member includes a second opening laterally aligned with the first opening in the outboard wall, the off-center impact structure extending through both the first opening and the second opening.

16. The vehicle body structure according to claim 15, further comprising
a sleeve that extends through the first opening, the hollow interior and the second opening, the sleeve being fixedly attached to the outboard wall and the inboard wall with at least a part of the first linear portion of the first member extending into the sleeve, the first linear portion of the first member being directly attached to the sleeve.

17. The vehicle body structure according to claim 16, wherein
the sleeve is welded to the outboard wall and welded to the inboard wall.

18. The vehicle body structure according to claim 17, wherein
the first linear portion of the first member is directly attached to the sleeve via a removable fastener.

19. The vehicle body structure according to claim 18, wherein
the second member is directly attached to the first member via a removable fastener.

* * * * *